United States Patent
Bird et al.

(10) Patent No.: US 9,327,780 B1
(45) Date of Patent: May 3, 2016

(54) AERODYNAMIC BUMPER CENTER DEFLECTOR FOR A TRUCK OR TRACTOR VEHICLE

(71) Applicant: VOLVO TRUCK CORPORATION, Göteborg (SE)

(72) Inventors: James Daniel Bird, Oak Ridge, NC (US); Cory Borghi, Torrance, CA (US); Anders Hedkvist Mauritsson, Jamestown, NC (US); Raja Sengupta, Jamestown, NC (US); Bo Philipsen, Greensboro, NC (US)

(73) Assignee: VOLVO TRUCK CORPORATION, Gothenburg (DE)

( * ) Notice: Subject to any disclaimer, the term of this patent is extended or adjusted under 35 U.S.C. 154(b) by 0 days.

(21) Appl. No.: 14/857,118

(22) Filed: Sep. 17, 2015

(51) Int. Cl.
  *B62D 35/02* (2006.01)
  *B60R 19/02* (2006.01)
  *B62D 35/00* (2006.01)

(52) U.S. Cl.
  CPC .............. *B62D 35/02* (2013.01); *B60R 19/023* (2013.01); *B62D 35/005* (2013.01)

(58) Field of Classification Search
  CPC .... B60R 19/02; B60R 19/023; B62D 35/001; B62D 35/004; B62D 35/005; B62D 35/02
  USPC .............................. 296/180.1, 180.2; 293/120
  See application file for complete search history.

(56) References Cited

U.S. PATENT DOCUMENTS

| | | | | |
|---|---|---|---|---|
| 5,139,304 A | * | 8/1992 | Tajiri ................... | B62D 35/007 293/117 |
| 2013/0026783 A1 | | 1/2013 | Kakiuchi et al. | |
| 2014/0070564 A1 | * | 3/2014 | Bernard .............. | B62D 35/005 296/180.3 |
| 2015/0336615 A1 | * | 11/2015 | Lim ..................... | B62D 21/155 296/187.09 |

FOREIGN PATENT DOCUMENTS

| | | | | |
|---|---|---|---|---|
| DE | 102008059021 A1 | | 5/2010 | |
| DE | 102014004385 | * | 10/2015 | .............. B60R 19/12 |
| FR | 2935668 A1 | | 3/2010 | |
| JP | 2423051 A1 | * | 2/2012 | .............. B60R 19/02 |
| WO | 2013054171 A1 | | 4/2013 | |

* cited by examiner

*Primary Examiner* — Jason S Daniels
(74) *Attorney, Agent, or Firm* — Martin Farrell; Michael Pruden

(57) ABSTRACT

A center deflector for a front bumper of a truck or tractor vehicle includes a thickened portion extending upward from the inner deflector surface and extends laterally across a deflector section, preferably spanning substantially an entire width of the deflector section thereof. The thickened portion comprises a cross-sectional shape having a height that gradually declines from an intermediate maximum height to a reduced height along a rear edge thereof, and preferably resembles an airfoil. The thickened portion may include a hollow interior containing a pressurized gas.

14 Claims, 10 Drawing Sheets

AERODYNAMIC BUMPER CENTER DEFLECTOR FOR A TRUCK OR TRACTOR VEHICLE

FIELD OF THE DISCLOSURE

The present disclosure relates generally to an aerodynamic center deflector for a front bumper of a truck or tractor vehicle (e.g., usable for hauling a semi-trailer) for highway use, and to a front bumper including such a center deflector.

BACKGROUND

Aerodynamic drag (wind resistance) accounts for a majority of energy losses incurred by truck and tractor vehicles when traveling at highway speeds. Reducing drag improves fuel efficiency.

Existing front bumper assemblies for highway trucks or tractor vehicles typically include a wide center section, corner sections adjacent to the center section, and a center deflector below the center section. A corner deflector may also be arranged below each corner section. A potential benefit of providing a bumper assembly in multiple parts is that if a single part is damaged in a collision, then that part may be individually replaced without requiring replacement of the entire bumper assembly.

Typically, a center section of a truck or tractor vehicle front bumper is substantially forward-facing, and includes a forward opening to admit air into an engine compartment to facilitate cooling of an engine radiator. A center deflector arranged below the center section typically includes a curved outer surface to direct air below the engine compartment. To provide sufficient structural integrity and vibration resistance, an inner surface of a conventional center deflector may include numerous ribs (e.g., longitudinal and/or diagonal ribs) terminating at an upwardly-extending edge flange positioned at a trailing edge of the deflector. Drain holes may also be provided along the edge flange to facilitate water drainage. Air admitted into the engine compartment through the forward opening of the center section is directed toward and along the inner surface of the center deflector. As one stream of air flowing along the inner surface of the center deflector rejoins another stream of air directed below the engine compartment by the outer surface of the center deflector, the two airflow streams typically create a disrupted airflow region, with such disrupted airflow leading to increased aerodynamic drag.

A need exists in the art for improvements in center deflectors and front bumpers of highway truck or tractor vehicles to overcome limitations of conventional devices.

SUMMARY

The present disclosure concerns a center deflector for a front bumper of a truck or tractor vehicle., with the A preferred center deflector includes aing panel of sheet-like material shaped to guide air flow under a front bumper. The center deflector includes a thickened portion (e.g., a convex protuberance) that projectsextending upward from the an inner deflector surface, spanning that extends laterally across the deflector section (preferably spanning substantially an entire width thereof) the deflector section, and comprising that includes a cross-sectional shape that increases in height above the inner deflector surface from a leading edge of the thickened portion to an intermediate maximum and that gradually declines from the intermediate maximum height to a reduced height along a rear edge of the thickened portion. The thickened portion preferably comprises a cross-sectional shape that resembles an airfoil. The gradual tapering in height of the thickened portion allows the airstreams flowing past the inner and outer deflector surfaces to rejoin in a clean manner downstream of the center deflector. The generally smooth and uninterrupted airflow above and below the thickened portion reduces aerodynamic drag of a truck or tractor vehicle incorporating the center deflector. Additionally, the thickened portion serves as a structural cross member that provides structural stability (e.g., resistance to flexure and vibration) and thus may eliminate the need for an upwardly-extending edge flange positioned at the trailing edge and/or for elongated structural ribs extending upward from the inner deflector surface. Relative to conventional devices, a center deflector as disclosed herein may provide equivalent or better structural stability with reduced aerodynamic drag, reduced weight, and reduced fabrication cost.

In one aspect, a center deflector for a front bumper of a truck or tractor vehicle for highway use includes multiple elements, including: a leading edge with respect to a forward direction of travel of the truck or tractor vehicle; a trailing edge arranged below and behind the leading edge; a deflector section comprising a curved cross-sectional shape extending from the trailing edge in a forward and generally upward direction toward the leading edge, wherein the deflector section comprises a road-facing outer deflector surface and an engine-facing inner deflector surface; an upwardly-extending left stanchion arranged along a left boundary of the deflector section; and an upwardly-extending right stanchion arranged along a right boundary of the deflector section; wherein the deflector section comprises a thickened portion extending upward from the inner deflector surface and spanning substantially an entireextending laterally across at least a portion width of the deflector section between the left stanchion and the right stanchion, the thickened portion comprising a cross-sectional shape having a height that gradually declines from an intermediate maximum height to a reduced height along a rear edge of the thickened portion. In certain embodiments, a deflector section includes upwardly-extending left stanchion arranged along a left boundary of the deflector section, and an upwardly-extending right stanchion arranged along a right boundary of the deflector section, wherein the thickened portion spans substantially an entire width of the deflector section between the left stanchion and the right stanchion.

Additional features are included in various embodiments of the invention. As noted previously, in certain embodiments the thickened portion comprises a cross-section shape that resembles an airfoil. In certain embodiments, the thickened portion comprises a hollow interior, which may be enclosed (e.g., with a sealing plug arranged to seal the hollow interior) and contain a pressurized gas. The thickened portion preferably has sufficient stiffness to be self-supporting and eliminate the need for a center deflector to include additional structural elements that interfere with desired airflow past the center deflector.

Preferably, the thickened portion is arranged closer to the trailing edge than to the leading edge. In certain embodiments, an average distance between the thickened portion (e.g., at a region of maximum height thereof) and the leading edge is at least two times, at least three times, at least four times, or at least five times greater than an average distance between the thickened portion and the trailing edge.

In certain embodiments, each of the left stanchion and the right stanchion comprises an increased thickness portion arranged in contact with the thickened portion of the deflector section. In other embodiments, the stanchions may be devoid of increased thickness portions contacting the thickened portion of the deflector section. In certain embodiments, a center section may include an edge lip extending rearwardly from the leading edge and defining a plurality of openings arranged to receive a plurality of fasteners.

In another aspect, a front bumper of a truck or tractor vehicle for highway use includes a center deflector as disclosed herein. In certain embodiments, multiple removable fasteners may be arranged to couple the center deflector to a center section of the front bumper. In other embodiments, the center deflector may be integrally formed with at least one other component of a bumper, such as one or more of a center section, a left corner deflector, and a right corner deflector of the front bumper.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawings.

DETAILED DESCRIPTION

The present disclosure is directed to a center deflector for a front bumper of a truck or tractor vehicle (e.g., usable for hauling a semi-trailer) for highway use. The center deflector includes a panel of sheet-like material shaped to guide air flow under a front bumper, with a thickened portion (e.g., a convex protuberance) extending that projects upward from the inner deflector surface, that preferably spansning substantially an entire width of a section of the center deflector section, and that comprises a cross-sectional shape having a height that gradually declines from an intermediate maximum height to a reduced height along a rear edge of the thickened portion. The thickened portion preferably comprises a cross-sectional shape that resembles an airfoil, with a gradual tapering that allows airstreams flowing past the inner and outer deflector surfaces to rejoin in a clean manner downstream of the center deflector. The generally smooth and uninterrupted airflow above and below the thickened portion reduces aerodynamic drag of a truck or tractor vehicle incorporating the center deflector. Relative to a conventional center deflector including elongated structural ribs terminating at an upwardly-extending edge flange positioned at the trailing edge, a center deflector including a thickened portion as disclosed herein may provide equivalent or better structural stability with reduced aerodynamic drag, reduced weight, and reduced fabrication cost.

Multiple views of a center deflector 10 for a front bumper of a truck or tractor vehicle according to one embodiment are provided in FIGS. 1-5.

Figure 1:
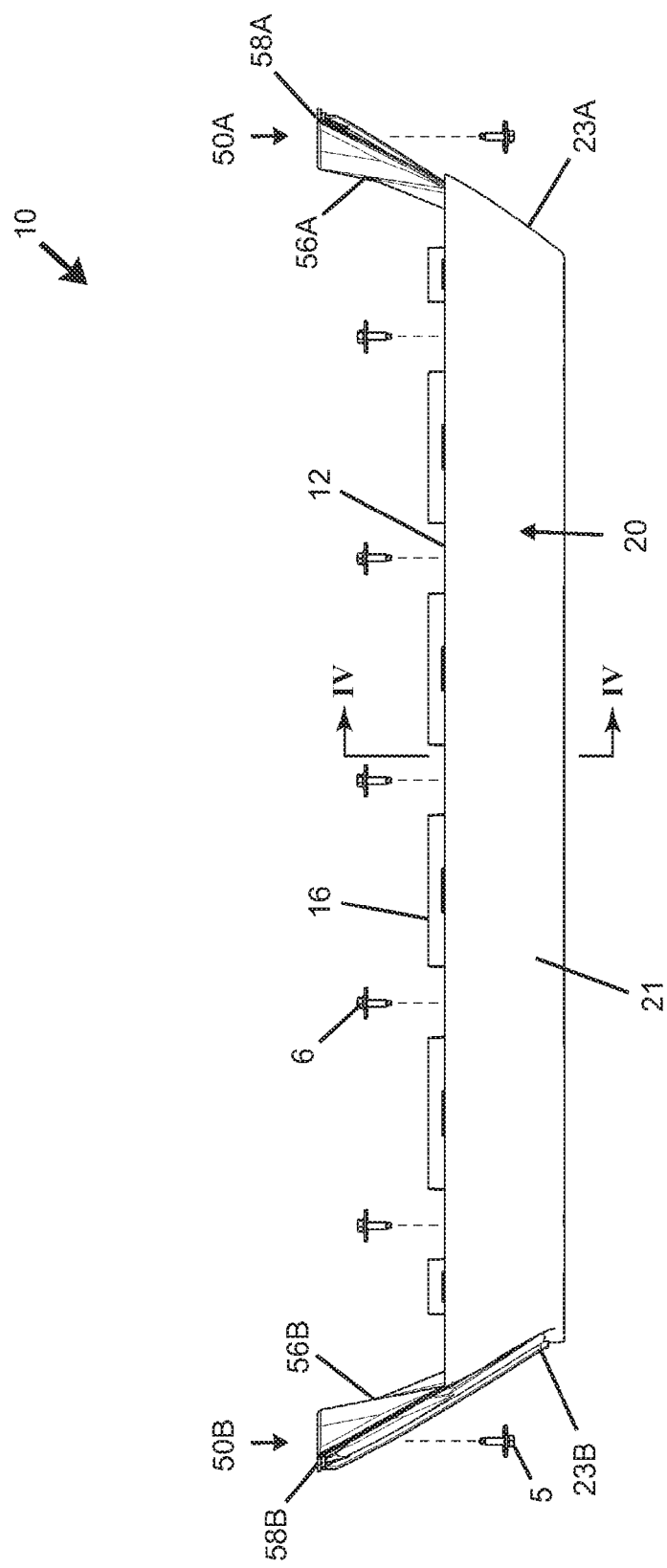
FIG. 1 is a front elevation view of a center deflector for a front bumper of a truck or tractor vehicle with illustration of fasteners in assembly view prior to insertion of the fasteners into openings defined in the center deflector according to one embodiment of the present disclosure.
Figure 2:
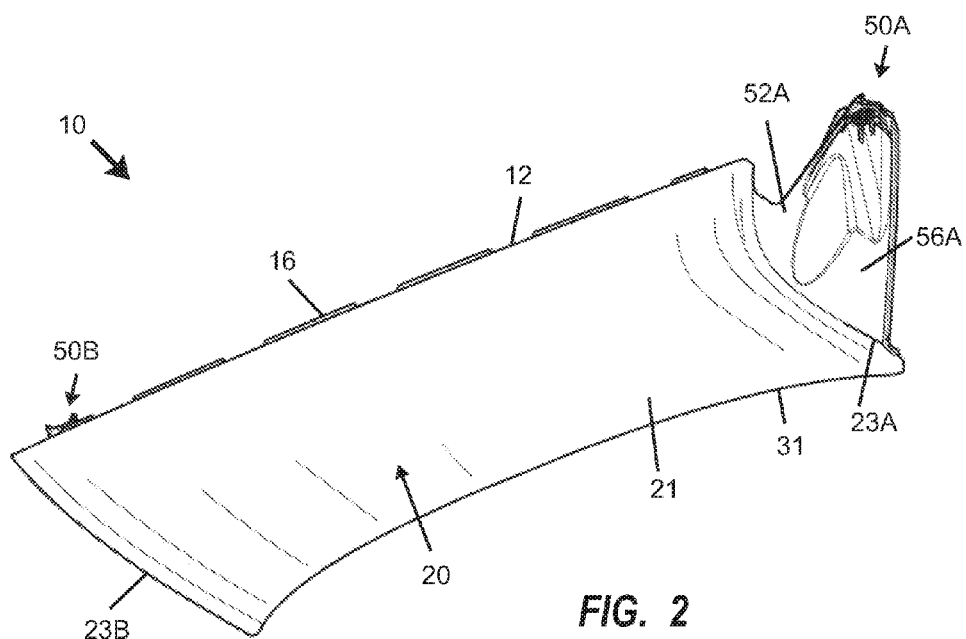
FIG. 2 is a lower perspective view of the center deflector of FIG. 1.

FIG. 1 is a front elevation view of a center deflector 10 with illustration of fasteners 5, 6 in assembly view prior to insertion of the fasteners 5, 6 into openings defined in the center deflector 10. The center deflector 10 includes a deflector section 20 that includes a curved outer deflector surface 21 having a leading edge 12. An edge lip 14 (shown in FIGS. 3-5) extends in a rearward direction from the leading edge 12, and tabs 16 extend upward from the edge lip 14 behind the leading edge 12. The tabs 16 may embody snap fit tabs suitable for mounting to a fascia of a center section 70 (e.g., as shown in FIGS. 6-10). The deflector section 20 extends laterally between left and right stanchions 50A, 50B, with each stanchion 50A, 50B including an upwardly extending wall 56A, 56B and an upper surface 58A, 58B. As shown in FIG. 2, the stanchions 50A, 50B contact the deflector section 20 at joints 23A, 23B. Each stanchion 50A, 50B includes a front portion (e.g., front portion 52A) that connects the stanchion to an upwardly curving portion of the deflector section 20. FIG. 2 also shows that the deflector section 20 includes a trailing edge 31 that is arranged below and behind the leading edge 12.

Figure 3:
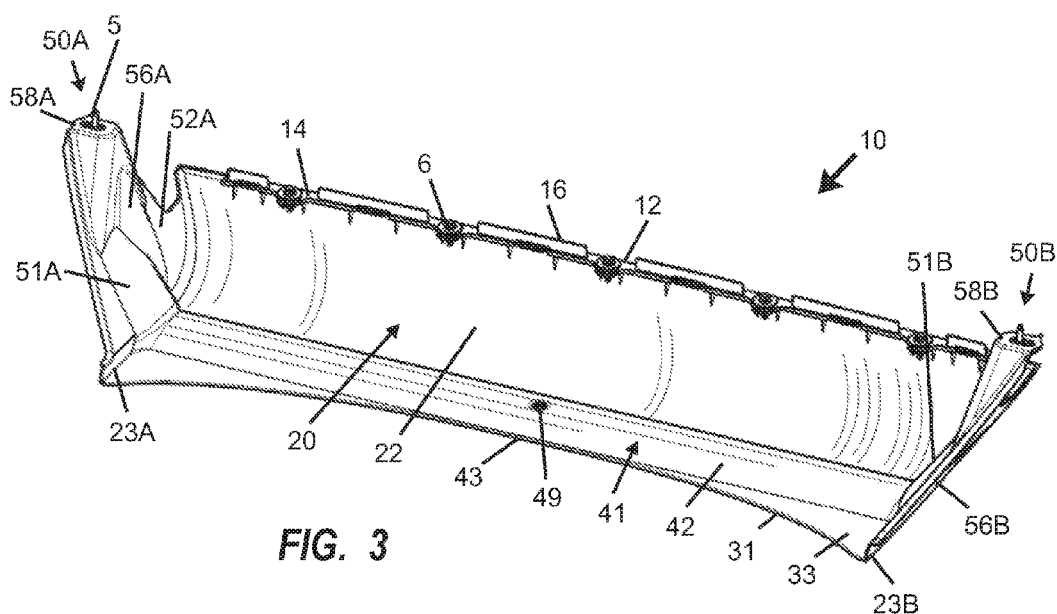
FIG. 3 is an upper perspective view of the center deflector of FIGS. 1 and 2 following insertion of fasteners into openings of the center deflector, and showing a thickened portion that extends upward from an inner deflector surface.

FIG. 3 is an upper perspective view of the center deflector 10 following insertion of fasteners 5 into openings defined in the upper surfaces 58A, 58B of the stanchions 50A, 50B, and following insertion of fasteners 6 into openings defined in the edge lip 14 proximate to the leading edge 12. A thickened portion 41 of the deflector section 20 extends upward from an inner deflector surface 22. The thickened portion 41 extends in a lateral direction across the entire width of the deflector section 20 and contacts thickened portions 51A, 51B of the stanchions 50A, 50B. The thickened portion 41 of the deflector section 20 includes a curved upper surface 42 and a rear edge 43. Along a central portion of the thickened portion 41, the rear edge 43 of the thickened portion 41 is arranged at or proximate to the trailing edge 31 of the deflector section 20. Rearwardly extending portions 33 of the deflector section 20 are arranged behind the thickened portion 41 to connect with the stanchions 50A, 50B at joints 23A, 23B.

Figure 4:
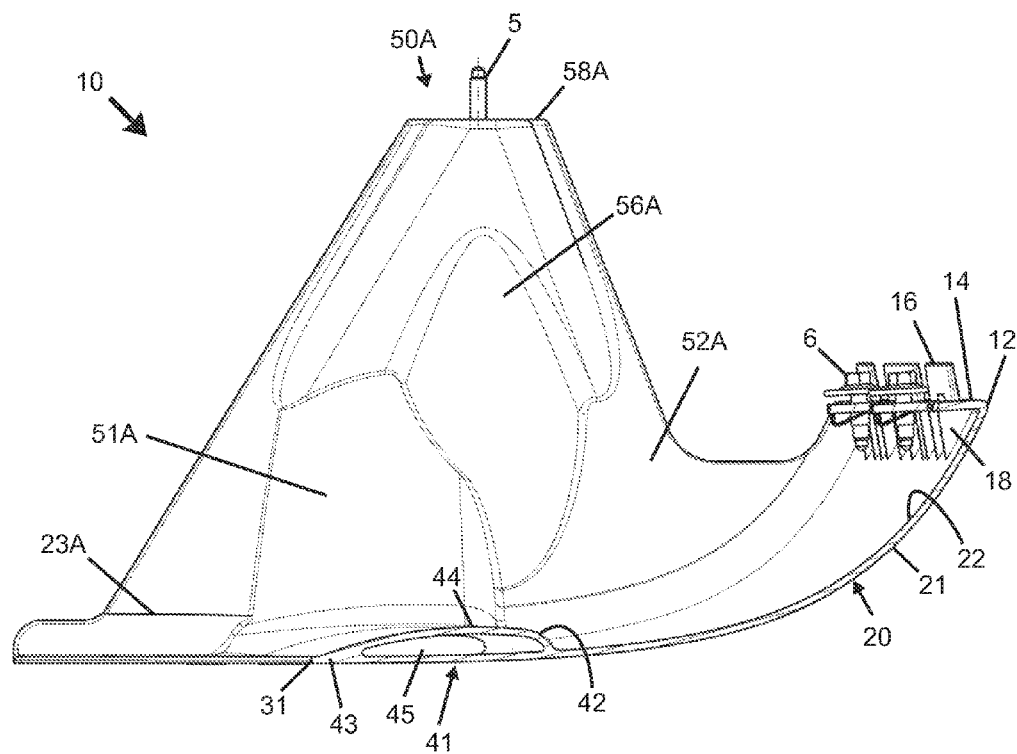
FIG. 4 is a cross-sectional view of the center deflector of FIGS. 1-3 taken along section lines IV-IV shown in FIG. 1, following insertion of the fasteners into apertures of the center deflector, and showing the thickened portion extending upward from the inner deflector surface.
Figure 5:
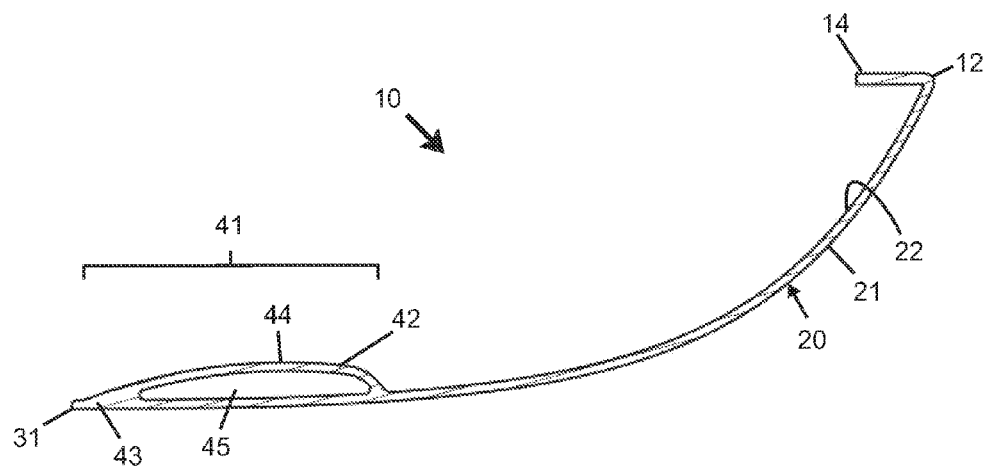
FIG. 5 is a magnified cross-sectional view of a medial portion (i.e., the deflector section) of the center deflector of FIGS. 1-4 showing the general contour of the center deflector including a hollow thickened portion resembling an airfoil.

As shown in FIG. 3, the thickened portion 41 includes a sealing plug 49 arranged to seal a hollow interior of the thickened portion 41, which preferably contains a pressurized gas (e.g., carbon dioxide, nitrogen, air, argon, or any other suitable gas) at any suitable pressure above atmospheric pressure. The center deflector 10 is preferably fabricated via injection molding from a suitable polymeric material, such as (but not limited to) a blend of polycarbonate (PC) and acrylonitrile butadiene styrene (ABS). A blend of PC and ABS may yield balanced impact, flow, and heat properties for injection molding, with desirable strength, weight, and high tolerance to harsh environments. Such material may optionally be reinforced with fibers, composites, and/or other additives. Other polymeric materials and/or metallic or composite materials may be used. During injection molding, pressurized gas may be introduced into the thickened portion 41 to form an interior channel 45 (such as shown in FIGS. 4-5) within the thickened portion 41. Following introduction of pressurized gas into the interior channel 45, an opening through which the gas was introduced may be sealed with the sealing plug 49. In certain embodiments, the interior channel 45 may extend into the thickened portions 51A, 51B of the stanchions 50A, 50B. In other embodiments, stanchions 50A, 50B may be devoid of thickened portions contacting the thickened portion 41 of the deflector section 20.

FIG. 4 is a cross-sectional view of the center deflector 10 taken along section lines IV-IV shown in FIG. 1. As shown in FIG. 4, the deflector section 20 includes a generally curved cross-sectional shape that extends from the leading edge 12 in a downward and generally downrearward direction toward the trailing edge 31. The deflector section 20 includes a generally convex road-facing outer deflector surface 21 and an engine-facing generally concave inner deflector surface 22. An edge lip 14 extends in a rearward direction from the leading edge 12, and multiple generally triangular structural support tabs 18 may be provided below the edge lip 14 to provide structural support for the edge lip 14. As shown in FIG. 4, the structural support tabs 18 do not extend in a rearward direction beyond the edge lip 14. In this respect, the structural support tabs 18 differ from elongated longitudinal and/or diagonal ribs associated with conventional center deflectors, which typically are elongated and terminate at an upwardly-extending edge flange positioned at a trailing edge of a conventional center deflector. Fasteners 5, 6 shown in FIG. 4 may be utilized to mount the center deflector 10 to a center section (e.g., center section 70 as shown in FIGS. 5-8) of a front bumper of a truck or tractor vehicle.

FIG. 5 is a cross-sectional view of a portion of the deflector section 20. As shown in FIGS. 4 and 5, the thickened portion 41 of the deflector section 20 extends upward from the inner deflector surface 22. The thickened portion 41 includes a generally curved upper surface 42 and includes a height that gradually declines from an intermediate region 44 having a maximum height to a reduced height along a rear edge 43 of the thickened portion 41. As shown in FIGS. 4 and 5, a portion of the rear edge 43 may be arranged on or proximate to a trailing edge 31 of the deflector section 20. The interior channel 45 within the thickened portion 41 preferably contains a pressurized gas, and such channel 45 may extend into thickened portions 51A, 51B of the stanchions 50A, 50B.

FIGS. 6-11 illustrate a front bumper 90 of a truck or tractor vehicle according to one embodiment and incorporating the center deflector 10 of FIGS. 1-5.

Figure 6:
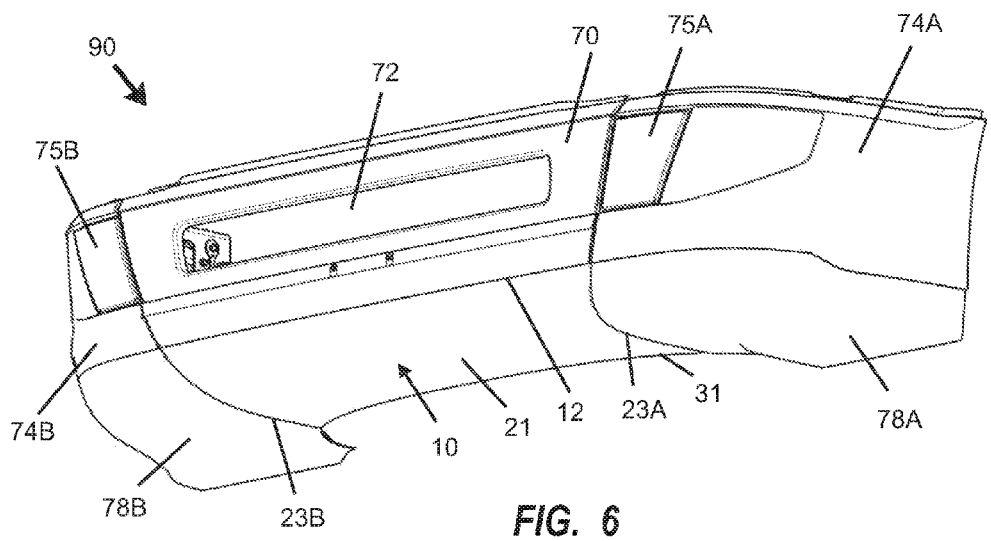
FIG. 6 is a lower front perspective view of a front bumper of a truck or tractor vehicle according to one embodiment and incorporating the center deflector of FIGS. 1-5.
Figure 7:
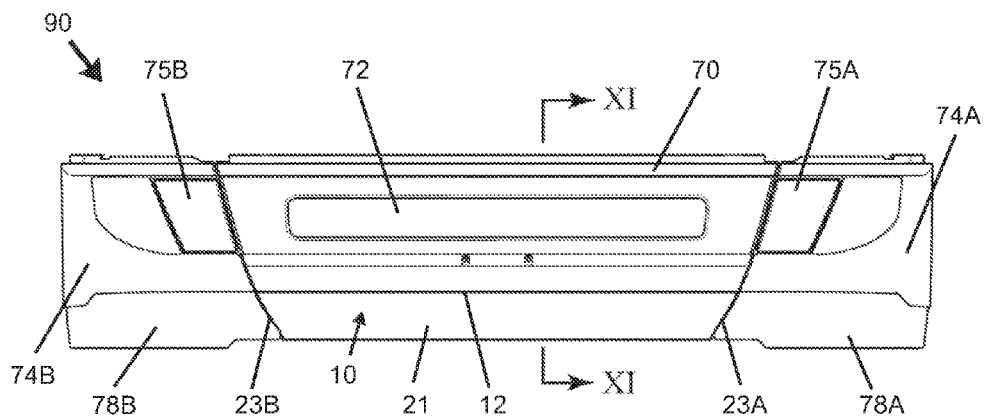
FIG. 7 is a front elevation view of the front bumper of FIG. 6.
Figure 8:
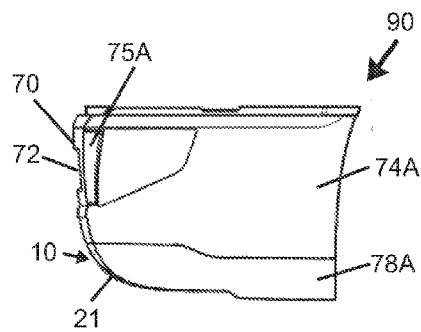
FIG. 8 is a left side elevation view of the front bumper of FIGS. 6-7.
Figure 12:
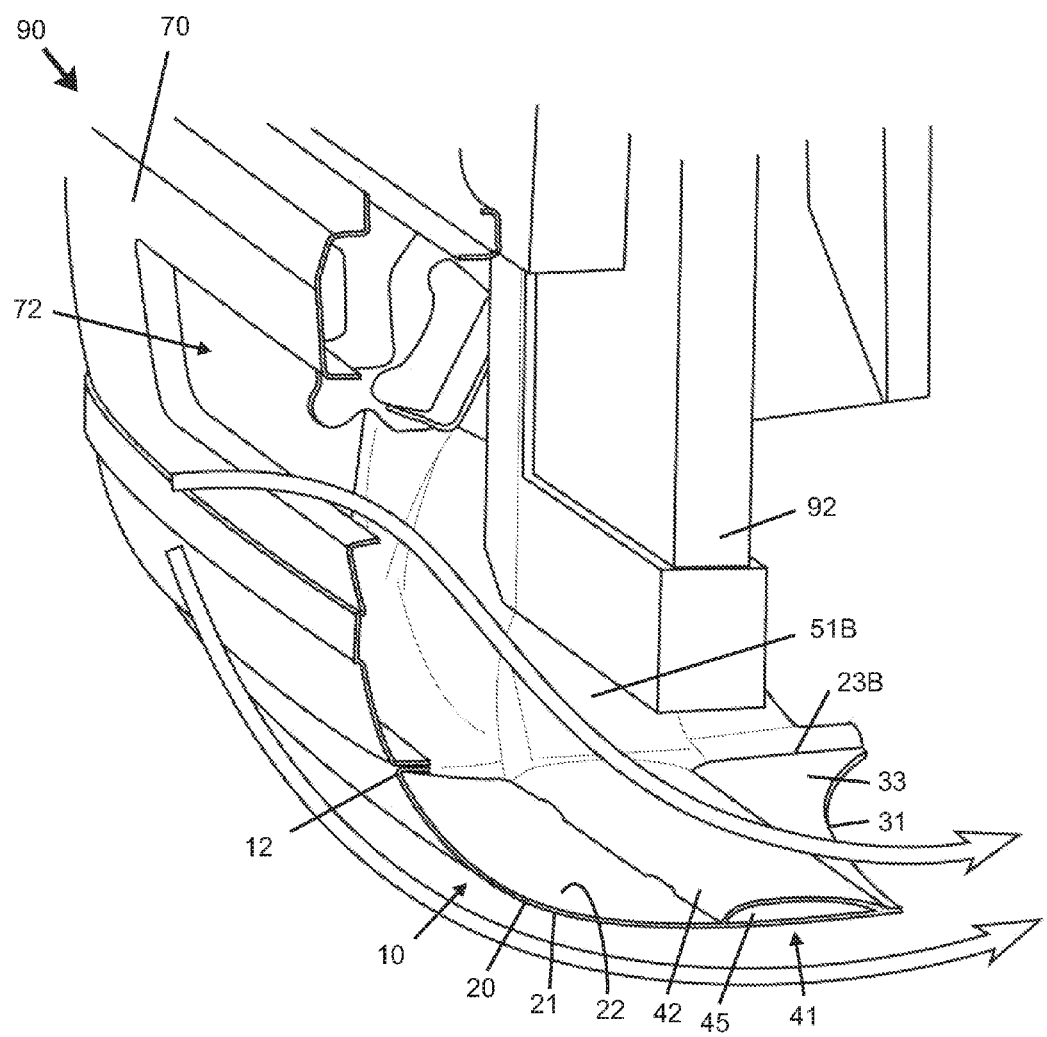
FIG. 12 is a simplified cross-sectional perspective view of a portion of a front bumper of a truck or tractor vehicle incorporating a center deflector according to FIGS. 1-5 in accordance with one embodiment of the present disclosure, with a radiator arranged behind the bumper, with the addition of arrows showing first and second paths of air flowing along respective inner and outer surfaces of the center deflector.

FIGS. 6-8 provide lower front perspective, front elevation, and left side elevation views, respectively, of the front bumper 90. As shown in FIGS. 6-8, the front bumper 90 generally includes a wide center section 70, left and right corner sections 74A, 74B adjacent to the center section 70, a center deflector 10 below the center section 70, and left and right corner deflectors 78A, 78B arranged below the left and right corner sections 74A, 74B. The left and right corner sections 74A, 74B preferably include headlights 75A, 75B. The center section 70 includes a central opening 72 arranged to admit air into the front bumper 90 to permit cooling of a radiator 92 (as shown in FIG. 12) during use of a truck or tractor vehicle incorporating the bumper 90. The central opening 72 defined in the center section 70 spans a majority of (or substantially the entirety of) the width of the deflector section 20 of the center deflector 10 arranged below the center section 70.

Preferably, the center section 70, the corner sections 74A, 74B, the center deflector 10, and the corner deflectors 78A, 78B abut one another to minimize gaps therebetween and prevent substantial airflow between the preceding elements. A potential advantage of providing a front bumper 90 including multiple elements is that damage incurred with respect to one element (e.g., the center section 70 or the corner sections 74A, 74B) may not require the entire front bumper 90 to be replaced. Providing a front bumper 90 with multiple elements may also aid in servicing a truck or tractor vehicle by permitting one element (e.g., the center deflector 10) to be removed for accessing engine components without requiring removal of the entire front bumper 90.

Figure 9:
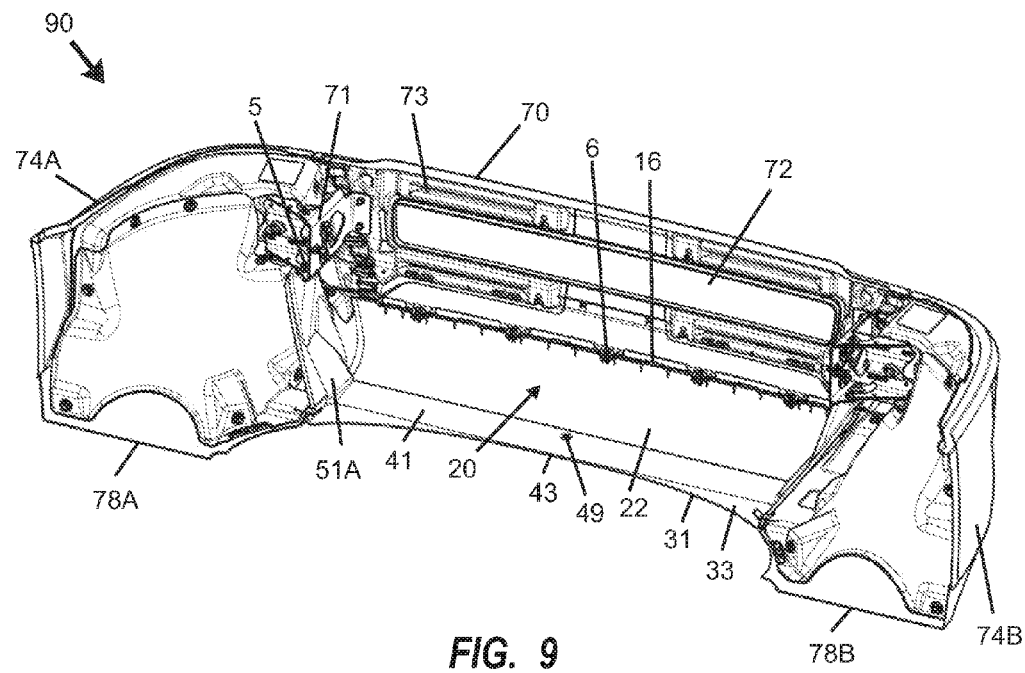
FIG. 9 is an upper rear perspective view of the front bumper of FIGS. 6-8.
Figure 10:
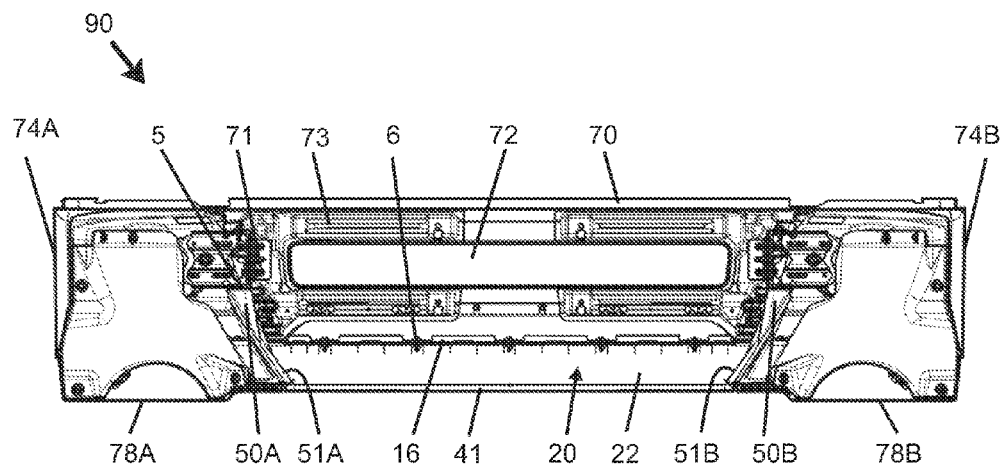
FIG. 10 is a rear elevation view of the front bumper of FIGS. 6-9.

FIGS. 9-10 provide upper rear perspective and rear elevation views, respectively, of the front bumper 90 illustrated in FIGS. 7-8. As shown in FIGS. 9-10, the center deflector 10 is arranged below and generally behind the center section 70, with fasteners 5, 6 serving to connect the center deflector 10 to the center section 70. The center section 70 preferably includes internal reinforcing elements 73 (e.g., fabricated of metal) and support brackets 71. The central opening 72 defined in the center section 70 is arranged above and spans a majority of (or substantially the entirety of) the width of the deflector section 20 of the center deflector 10. The center deflector 10 is arranged inboard of and generally between the left and right corner deflectors 78A, 78B, which are arranged below the left and right corner sections 74A, 74B. In the embodiment shown in FIGS. 9-10, the thickened portion 41 extends laterally across the entire width of the deflector section 20 and contacts thickened portions 51A, 51B of the stanchions 50A, 50B.

Figure 11:
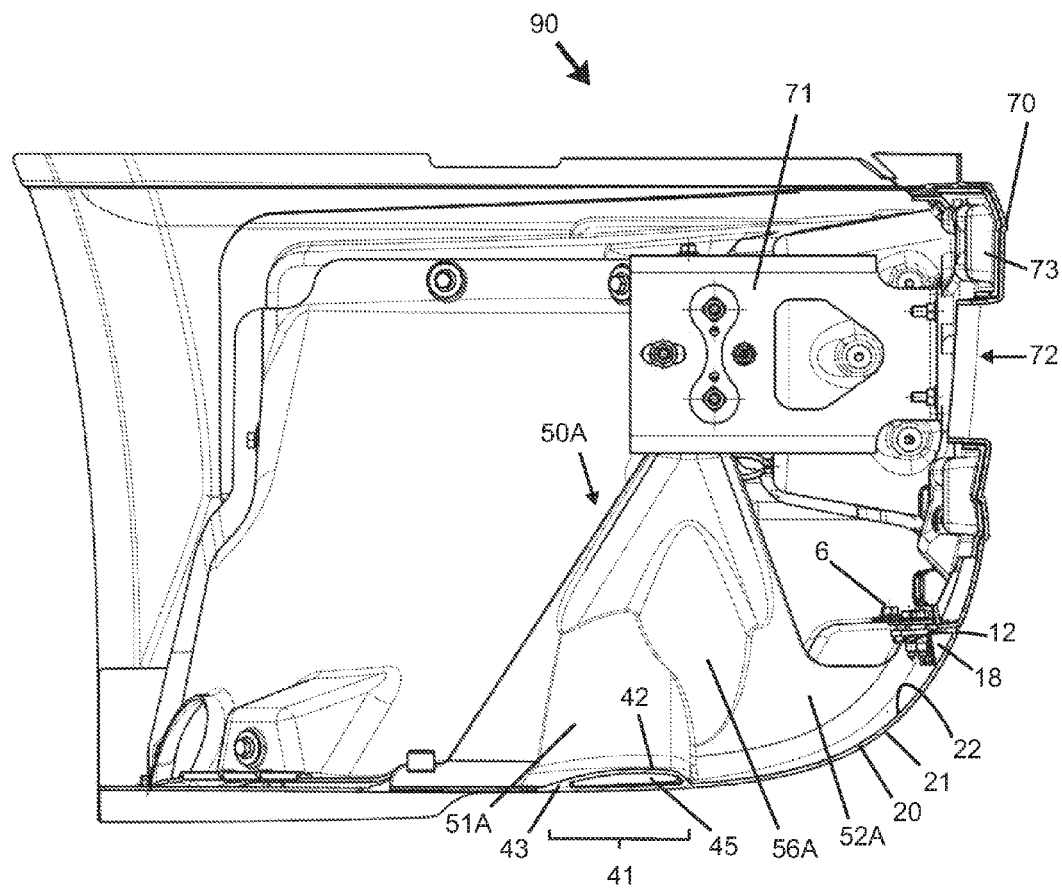
FIG. 11 is a cross-sectional view of the front bumper of FIGS. 6-10 taken along section lines XI-XI shown in FIG. 7.

FIG. 11 is a cross-sectional view of the front bumper 90 of FIGS. 6-10 taken along section lines XI-XI illustrated in FIG. 7. All of the numbered elements depicted in FIG. 11 have been described in connection with the preceding figures.

FIG. 12 is a simplified cross-sectional perspective view of a portion of a front bumper 90 of a truck or tractor vehicle incorporating a center deflector 10 according to FIGS. 1-5 in accordance with one embodiment, with a radiator 92 arranged behind the front bumper 90. FIG. 12 also includes curved arrows showing first and second paths of air flowing along inner and outer surfaces of the center deflector 10. In particular, the upper curved arrow shows a first path of air admitted through the central opening 72 defined in the center section 70, with such air flowing downward proximate to the engine-facing inner deflector surface 22. The lower curved arrow shows a second path of air flowing in a generally downward and rearward direction proximate to the road-facing outer deflector surface 21, past the leading edge 12 and thereafter past the trailing edge 31 of the center deflector 10. As shown in FIG. 12, the thickened portion 41 of the center deflector 10 has a cross-sectional shape that resembles an airfoil (or an aircraft wing), with a gradual in tapering in thickness from a central region of maximum thickness to a reduced thickness. Such shape of the thickened portion 41 including a gradual tapering in thickness allows the first and second airstreams flowing past the inner and outer deflector surfaces 21, 22 to rejoin in a clean manner downstream of the trailing edge 31 of the center deflector 10. The generally smooth and uninterrupted airflow above and below the thickened portion 41 reduces aerodynamic drag of a truck or tractor vehicle incorporating the center deflector 10.

Figure 13:
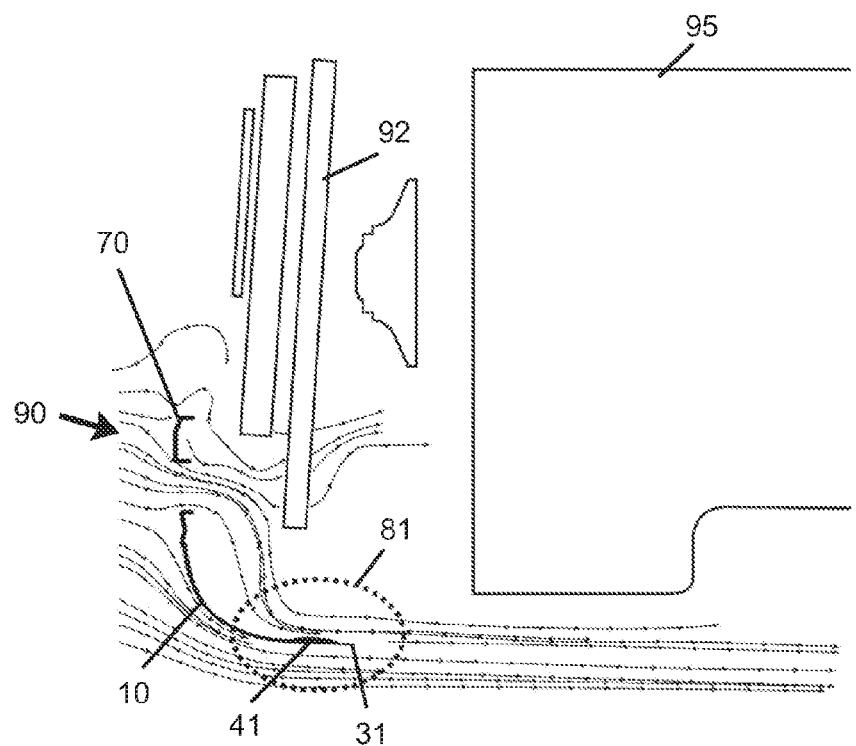
FIG. 13 provides simplified cross-sectional views of (i) a portion of a front bumper of a truck or tractor vehicle incorporating a center deflector according to one embodiment, and (ii) elements within an engine compartment of the truck or tractor vehicle, with addition of streamlines obtained by modeling showing flows of air through and past the bumper.

FIG. 13 provides simplified cross-sectional views of a portion of a front bumper 90 of a truck or tractor vehicle incorporating a center deflector 10 according to one embodiment, as well as a radiator 92 and an engine 95 arranged behind the bumper 90. FIG. 13 additionally includes streamlines obtained by modeling showing flows of air through and past the front bumper 90. The center deflector 10 includes a thickened portion 41 proximate to a trailing edge 31. The thickened portion 41 has a cross-sectional shape having a height that gradually declines from an intermediate maximum height to a reduced height along a rear edge of the thickened portion 41. An oval-shaped region of interest 81 illustrates that the streamlines immediately downstream of the trailing edge 31 are generally parallel, consistent with smooth flow past the center deflector 10.

Figure 14:
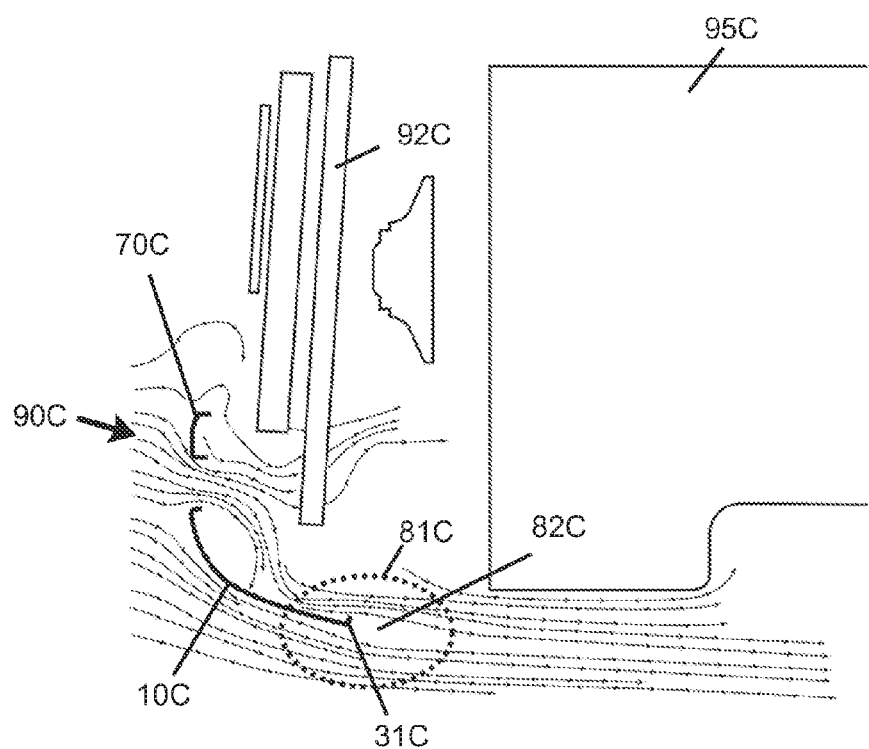
FIG. 14 provides simplified cross-sectional views of (i) a portion of front bumper of a truck or tractor vehicle including a conventional center deflector with an upwardly extending edge flange positioned at the trailing edge, and (ii) elements within an engine compartment of the truck or tractor vehicle, with addition of streamlines obtained by modeling showing flows of air through and past the bumper.

FIG. 14 provides simplified cross-sectional views of a portion of a front bumper 90C of a truck or tractor vehicle incorporating a conventional center deflector 10C, as well as a radiator 92C and an engine 95C arranged behind the bumper 90C. The center deflector 10C includes an upwardly extending edge flange positioned at the trailing edge 31C. FIG. 14 additionally includes streamlines obtained by modeling showing flows of air through and past the bumper 90C. An oval-shaped region of interest 81C illustrates that the streamlines immediately downstream of the trailing edge 31C diverge from one another, resulting in formation of a low-velocity disrupted airflow (or eddy) region 82C that increases aerodynamic drag.

A comparison between FIGS. 13-14 shows that center deflector designs according to embodiments disclosed herein can favorably reduce aerodynamic drag relative to conventional center deflectors.

Although various embodiments depicted herein disclose at least a central region of the thickened portion of a center deflector as being positioned proximate to a trailing edge of a center deflector, the front-to-back position of the center deflector may be adjusted to provide a desired balance between airflow characteristics and structural stability (e.g., resistance to flexure and vibration). Preferably, the thickened portion is arranged closer to the trailing edge than to the leading edge. In certain embodiments, an average distance between the thickened portion (e.g., at a region of maximum height thereof) and the leading edge is at least two times, at least three times, at least four times, or at least five times greater than an average distance between the thickened portion and the trailing edge.

Desirable thickened portions of center deflectors according to various embodiments preferably include a cross-sectional shape having a height that gradually declines from an intermediate maximum height to a reduced height along a rear edge of the thickened portion. While thickened portions of center deflectors according to various embodiments may desirably include cross-sectional shapes resembling airfoils, the present disclosure is not specifically limited to thickened portions having an airfoil shape. Other shapes may include ellipsoid sections, ovoid sections, or circular sections.

In certain embodiments, a thickened portion of a center deflector may comprise a length of about 124 mm (or preferably a length of at least about 50 mm, at least about 100 mm, within a range of from 50-250 mm, within a range of from 75-150 mm). In certain embodiments, a thickened portion of a center deflector may comprise a height of about 18 mm (or preferably a height of at least about 5 mm, at least about 10 mm, at least about 15 mm, at least about 20 mm, within a range of from 5-25 mm, within a range of from 10-20 mm, or within a range of from 15-20 mm).

Thickened portions of center deflectors according to various embodiments disclosed herein may extend in a generally lateral direction in a substantially straight line. In other embodiments, a thickened portion of a center deflector may extend in a generally lateral direction but may incorporate one or more curved shapes or angled portions when viewed from above.

In certain embodiments, a thickened portion of a center deflector may have a substantially constant cross-sectional shape and wall thickness at different lateral positions across the center deflector. In other embodiments, a thickened portion of a center deflector may have a cross-section that remains thickened but differs in cross-sectional shape and/or wall thickness at different lateral positions across the center deflector.

In various embodiments disclosed herein, a center deflector includes a deflector section having a substantially smooth outer deflector surface.

In certain embodiments, a center deflector of a front bumper for a truck of tractor vehicle may include a laterally extending thickened portion that extends upward from an inner deflector surface and may further include longitudinally oriented features (e.g., recesses or protrusions). Such features may be arranged in generally longitudinal direction, and may serve structural and/or aesthetic functions. The center deflector is preferably devoid of any upwardly-extending edge flange positioned at the trailing edge of the deflector section.

Figure 15:
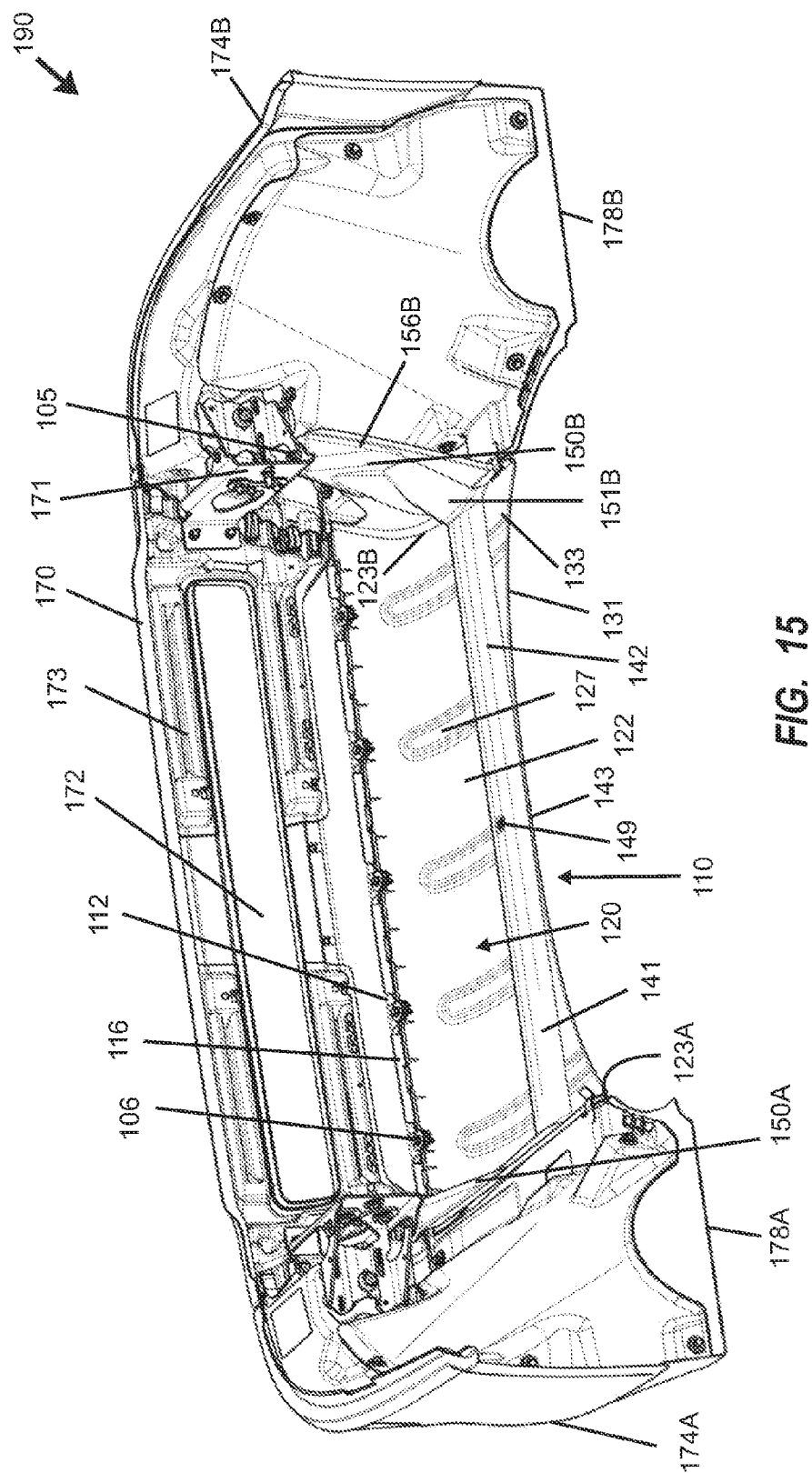
FIG. 15 is an upper rear perspective view of a front bumper of a truck or tractor vehicle incorporating a center deflector with a thickened portion that extends upward from an inner deflector surface and with longitudinally oriented features according to another embodiment of the present disclosure.

FIG. 15 is an upper rear perspective view of a front bumper 190 of a truck or tractor vehicle incorporating a center deflector 110 with a thickened portion 141 that extends upward from an inner deflector surface 122 and with longitudinally oriented features 127 according to one embodiment. The longitudinally oriented features 127 may include protrusions and/or recesses defined in the deflector section 120, and such features 127 may be visible along one or both of the inner deflector surface 122 and an outer deflector surface (not shown). The front bumper 190 generally includes an elongated center section 170, corner sections 174A, 174B, and corner deflectors 178A, 178B in addition to the center deflector 110. The center section 170 includes a central opening 172 arranged to admit air into an engine compartment (not shown) located behind the front bumper 190. The center section 170 preferably includes internal reinforcing elements 173 and support brackets 171.

With continued reference to FIG. 15, the center deflector 110 includes a deflector section 120 having a curved outer deflector surface (not shown) 121 and a curved inner deflector surface 122 that extend from a leading edge 112 to a trailing edge 131 of the center deflector 110. A thickened portion 141 of the deflector section 120 extends upward from an inner deflector surface 121. The thickened portion 141 extends in a lateral direction and spans the entire width of the deflector section 120 to contact upwardly-extending thickened portions (e.g., thickened portion 151B) of stanchions 150A, 150B. The thickened portion 141 of the deflector section 120 includes a curved upper surface 142 and a rear edge 143. Along a central portion of the thickened portion 141, the rear edge 143 of the thickened portion 141 is arranged at or proximate to the trailing edge 131 of the deflector section 120. Rearwardly extending portions 133 of the deflector section 120 are arranged behind the thickened portion 141 to connect with the stanchions 150A, 150B at joints 123A, 123B. Each stanchion 150A, 150B includes an upwardly extending wall (e.g., wall 156B). Fasteners 105 are arranged to connect upper surfaces of the stanchions 150A, 150B to the support brackets 171 of the center section 170. Additional fasteners 106 and snap fit tabs 116 are arranged proximate to the leading edge 112 to connect the center deflector 110 to the center section 170.

Figure 16:
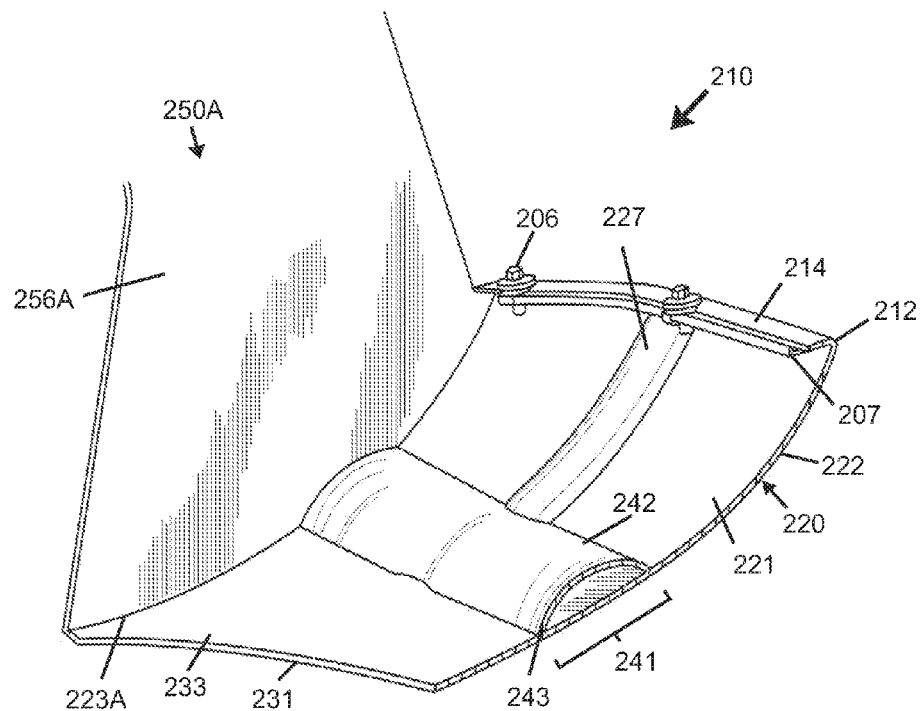
FIG. 16 is a simplified upper perspective partial cross-sectional view of a center deflector for a front bumper of a truck or tractor vehicle that includes a thickened portion extending upward from an inner deflector surface but lacking corresponding thickened portions of stanchions of the center deflector according to another embodiment of the present disclosure.

In certain embodiments, a center deflector may include a deflector section spanning between left and right stanchions, wherein the deflector section includes a laterally extending thickened portion but the stanchions are devoid of any thickened portions in contact with the thickened portion of the deflector section. For example, FIG. 16 provides an upper perspective partial cross-sectional view of a center deflector 210 including a deflector section 220 with a curved outer deflector surface 221 and a curved inner deflector surface 222 extending between a leading edge 212 and a trailing edge 231 of the center deflector 210. An edge lip 214 extends in a rearward direction from the leading edge 212. Fasteners 206 may extend through holes defined in the edge lip 214 to engage a support member 207, which may be part of a bumper center section (not shown).

A thickened portion 241 of the deflector section 220 extends upward from the inner deflector surface 221. The thickened portion 241 extends in a lateral direction and preferably spans the entire width of the deflector section 220 to contact an upwardly extending walls (e.g., wall 256A) of stanchions (e.g., stanchion 250A). The thickened portion 241 of the deflector section 220 includes a curved upper surface 242 and a rear edge 243, with a gradually tapering height from an intermediate region of maximum height to the rear edge 243. Notably, the stanchion 250A lacks any thickened portion in contact with the thickened portion 241 of the deflector section 220. Rearwardly extending portions 233 of the deflector section 220 are arranged behind the thickened portion 241 to connect with the stanchion 250A at joint 223A. One or more longitudinally oriented features 227 (which may embody recesses or protrusions) are further provided between the leading edge 212 and the thickened portion 241, which is preferably hollow and may contain a pressurized gas.

Figure 17:
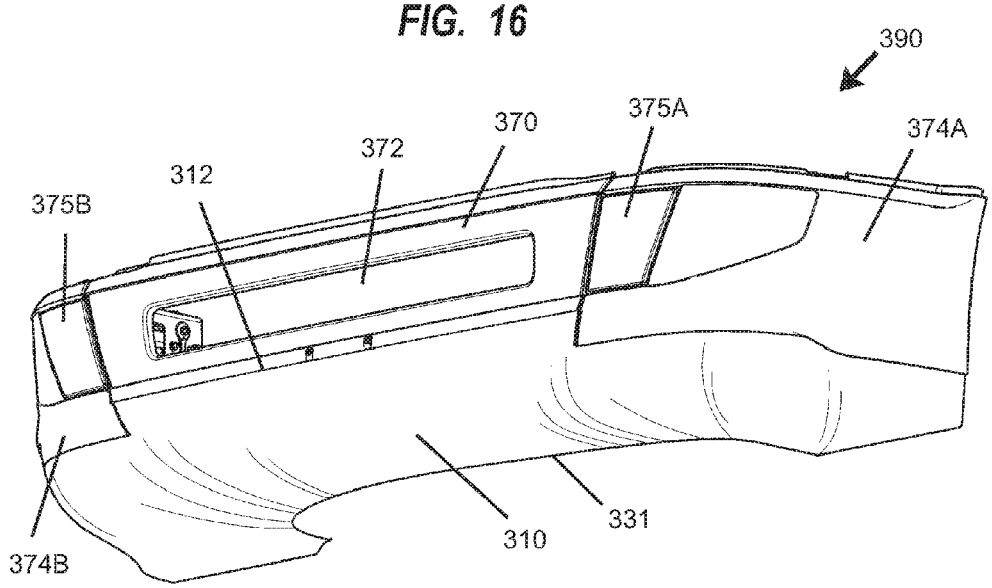
FIG. 17 is a lower perspective view of a front bumper of a truck or tractor vehicle including a center deflector portion integrated with one or more other portions thereof according to another embodiment of the present disclosure.

In certain embodiments, a center deflector as disclosed herein may be integrated with (e.g., integrally formed with) one or more portions of a front bumper of a truck or tractor vehicle—such as at least one of a center section, a left corner deflector, a right corner deflector, a left corner section, and a right corner section. For example, FIG. 17 is a lower perspective view of a front bumper 390 of a truck or tractor vehicle including a center deflector portion 310 spanning substantially the entire width of the front bumper 390, thereby incorporating the left corner deflector and the right corner deflector portions illustrated in FIGS. 6-7. Referring to FIG. 17, the front bumper 390 includes a wide center section 370 arranged between left and right corner sections 374A, 374B. The corner sections 374A, 374B preferably incorporate headlights 375A, 375B. The center section 370 includes an elongated central opening 372 arranged to admit air into the front bumper 390. Arranged below the center section 370 and the corner sections 374A, 374B is a center deflector 310 that curves generally downward and rearward from a leading edge 312 toward a trailing edge 331. The center deflector 310 spans substantially the entire width of the front bumper 390 below the center section 370 and the corner sections 374A, 374B. The center deflector 310 preferably includes a thickened portion (not shown but similar to embodiments previously disclosed herein) extending upward from the inner deflector surface, comprising a cross-sectional shape having a height that gradually declines from an intermediate maximum height to a reduced height along a rear edge of the thickened portion.

While the invention has been has been described herein in reference to specific aspects, features, and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A center deflector for a front bumper of a truck or tractor vehicle for highway use, the center deflector comprising:
 a leading edge with respect to a forward direction of travel of the truck or tractor vehicle;
 a trailing edge arranged below and behind the leading edge;
 a deflector section comprising a curved cross-sectional shape extending from the trailing edge in a forward and generally upward direction toward the leading edge, wherein the deflector section comprises a road-facing outer deflector surface and an engine-facing inner deflector surface;

an upwardly-extending left stanchion arranged along a left boundary of the deflector section; and an upwardly-extending right stanchion arranged along a right boundary of the deflector section;

wherein the deflector section comprises a thickened portion extending upward from the inner deflector surface and spanning substantially an entire width extending laterally across at least a portion of the deflector section between the left stanchion and the right stanchion, the thickened portion comprising a cross-sectional shape having a height that gradually declines from an intermediate maximum height to a reduced height along a rear edge of the thickened portion.

2. The center deflector of claim 1, wherein the thickened portion spans substantially an entire width of the deflector section between the left stanchion and the right stanchion.

3. The center deflector of claim 1, wherein the thickened portion comprises a cross-section shape that resembles an airfoil.

4. The center deflector of claim 1, wherein the thickened portion comprises a hollow interior.

5. The center deflector of claim 4, wherein the hollow interior is enclosed and contains a pressurized gas.

6. The center deflector of claim 5, wherein the thickened portion comprises a sealing plug arranged to seal the hollow interior.

7. The center deflector of claim 1, wherein the thickened portion is arranged closer to the trailing edge than to the leading edge.

8. The center deflector of claim 7, wherein an average distance between the thickened portion and the leading edge is at least three times greater than an average distance between the thickened portion and the trailing edge.

9. The center deflector of claim 1, wherein each of the left stanchion and the right stanchion comprises an increased thickness portion arranged in contact with the thickened portion of the deflector section.

10. The center deflector of claim 1, further comprising an edge lip extending rearwardly from the leading edge and defining a plurality of openings arranged to receive a plurality of fasteners.

11. The center deflector of claim 1, being devoid of any upwardly-extending edge flange positioned at the trailing edge.

12. A front bumper of a truck or tractor vehicle for highway use comprising the center deflector of claim 1.

13. The front bumper of claim 12, further comprising a plurality of removable fasteners arranged to couple the center deflector to a center section of the front bumper.

14. The front bumper of claim 12, wherein the center deflector is integrally formed with at least one of a center section, a left corner deflector, and a right corner deflector of the front bumper.

* * * * *